UNITED STATES PATENT OFFICE.

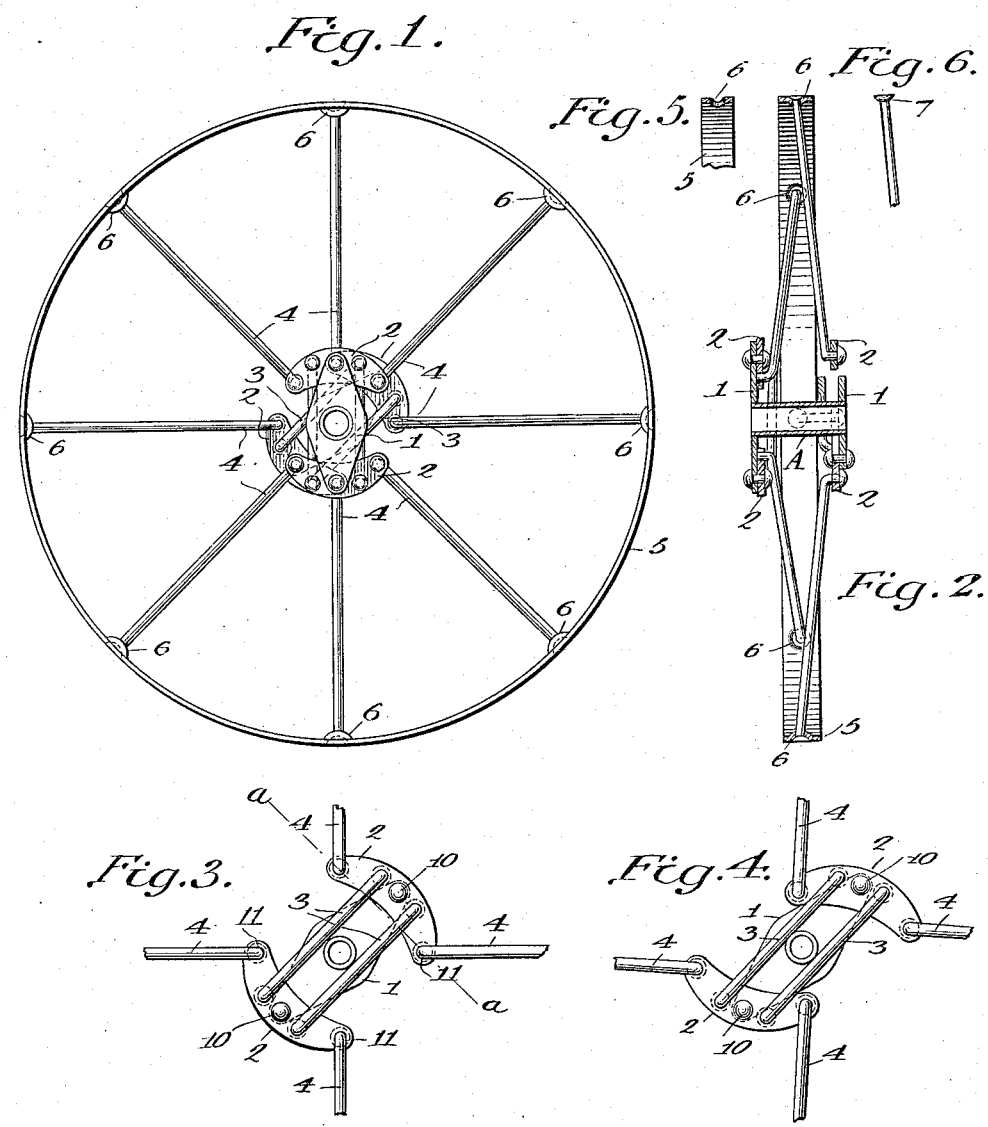

ARTHUR R. MISKIN, OF SALT LAKE CITY, UTAH, ASSIGNOR TO MISKIN SPRING WHEEL COMPANY, OF IDAHO FALLS, IDAHO, A CORPORATION.

SPRING-WHEEL.

1,173,839. Specification of Letters Patent. Patented Feb. 29, 1916.

Application filed May 18, 1912. Serial No. 698,092.

*To all whom it may concern:*

Be it known that I, ARTHUR R. MISKIN, a citizen of the United States, residing at 316 Center street, Salt Lake City, in the county of Salt Lake and the State of Utah, have invented certain new and useful Improvements in Spring-Wheels, of which the following is a specification.

My invention relates to improvements in spring wheels in which the inner ends of the spokes are pivoted to parallel yokes surrounding the hub which yokes are centrally pivoted to cross-bars at the ends of the hub, and the yokes that are disposed diametrically opposite each other being kept parallel by means of connecting rods.

The objects of my improvements are, first, to provide a simple form of spring wheel that will be light and durable, inexpensive, and neat in appearance; prevent jars and shocks, and vibration to the vehicle and to the occupants thereof, second, to provide a wheel that will absorb all vibration, so as to eliminate all ringing and roaring sounds, without the use of pneumatic or other rubber or composition tires.

I attain these objects by the mechanism illustrated in the accompanying drawings, in which—

Figure 1 is a face view of the wheel with two systems of connected spokes, one at each end of the hub; Fig. 2 is a view in transverse cross section of the wheel; Fig. 3 is a view, in elevation, of one system of the parallel yokes with connecting rods and cross-bar, shown for the purpose of giving a clearer view of the parts; Fig. 4 is a view similar to Fig. 3, showing the position the mechanism assumes when an obstacle is encountered in the roadway, or when a heavy load is placed on the wheel; Fig. 5 is a detail view of a short section of the tire showing a depression or socket in the tire to receive the head of the spoke 4 shown in Fig. 6. Fig. 6 is a detail view of the outer end of one of the spokes.

Similar numerals refer to similar parts throughout the several views.

In Fig. 1 the numeral 1 represents a short cross-bar to which are pivoted parallel yokes 2, at points equally distant from, and at a point outside of a straight line connecting, the points of attachment of the spokes 4. The yokes pivotally connected with the cross bar as stated, are diametrically opposite each other, and their pivots 10 are outside of a straight line, such as *a*, Fig. 3, uniting the pivotal points of attachment of the spokes and yokes. 3 represents connecting rods connecting diametrically opposite yokes 2, for the purpose of keeping the said yokes parallel to each other. Spokes 4 are pivoted at their inner ends to yokes 2. The other ends of said spokes 4 are formed into heads, rounded on the under, or inner, side; as shown in Fig. 6, and let into depressions 6 in tire 5 in a kind of ball-and-socket manner as shown in Figs. 1 and 2 and Figs. 5 and 6. The tire 5 is composed of spring steel or other resilient or elastic material of sufficient strength to carry the load when suspended from the said ring or tire 5.

In operation the tire 5 assumes an elliptical form, the greater the load, or the greater the concussion caused by an obstacle in the road, the more elliptical the tire becomes until it reaches the limit allowed by the inner mechanism, shown in Fig. 4. The possibility of the tire 5 to assume an elliptical form is accomplished in the following manner:—When an obstacle is encountered in the roadway it presses up on the spoke 4 nearest the ground which presses up on the end of the yoke 2 with which the said spoke is connected which causes the whole system to assume the position shown in Fig. 4, in which the spokes nearest the vertical position are drawn toward the center by the inner mechanism, and the horizontal spokes are allowed to move away from the center, as shown in Fig. 4, thereby allowing the tire 5 to assume an elliptical form while it is passing over an obstruction in the roadway, or when a heavy load is applied.

I have discovered that when the yokes 2 are connected by links 3, 3 and thus caused to move in parallelism, the wheel is materially strengthened, especially against lateral strains, as compared with an arrangement where the connecting links are not employed; and also that, by arranging the pivotal connections of the spokes 4 with the yokes 2 at points that are radially distant from the center of the wheel not greater than the radial distance of the pivotal connections of the yokes with the cross-bars 1, the strains upon all the spokes of any connected set, incident to the distortion of the wheel rim, are more uniform than when the pivotal connections of the spokes are radially more distant from the center of the wheel than the pivotal connections between the yokes and cross-bars 1, as would be the case should straight bars be employed instead of curved yokes, such as shown.

I am aware that prior to this my invention spring wheels have been made wherein spring steel rings, or tires, by means of systems of parallel beams, assume elliptical form when obstacles in the roadway are encountered. I therefore do not claim such a combination broadly; but

I claim—

1. In a spring wheel, the combination of a rim adapted to assume elliptical form under strains to which it may be subjected, spokes connected with the rim, a system of yokes pivotally supported near the center of the wheel, to which the spokes are connected in sets, and links uniting diametrically oppositely disposed yokes to cause them to be maintained in parallelism.

2. In a spring wheel, the combination of a yielding rim, yokes arranged in pairs diametrically opposite each other, that are pivotally supported near the center of the wheel, the yokes of each pair being disposed upon opposite transverse sides thereof, spokes connected with the rim at their outer ends and each connected at its inner end with one of the yokes, and links uniting the opposite yokes of the pairs and arranged to maintain them in parallelism as the rim is distorted in shape and the spokes moved.

3. In a spring wheel, the combination of a yielding rim, a hub, cross-bars secured to the hub, yokes pivoted between their ends to the said cross-bars, spokes secured at their inner ends to the said yokes near their ends, and connecting links uniting diametrically opposite yokes and maintaining them in parallelism.

4. In a spring wheel, the combination of a yielding rim, a hub, yokes supported near the center of the wheel, and spokes connected at their outer ends with the rim and at their inner ends with the said yokes, the points of connectioin between the spokes and the yokes being approximately the same radial distance from the center of the wheel as that of the pivots of the yokes.

5. In a spring wheel, the combination of a yielding rim, a hub, yokes pivotally supported near the center of the wheel, spokes connected at their outer ends with the rim and at their inner ends with the said yokes, the points of connection between the spokes and the yokes being approximately the same radial distance from the center of the wheel as that of the pivots of the yokes, and connecting links uniting the opposite yokes and arranged to maintain them in parallelism as the rim is distorted in shape.

6. In a spring wheel, the combination of a yielding rim, a hub, yokes pivotally supported near the center of the wheel, spokes having ball and socket connections at their outer ends with the rim, and pivotal connections at their inner ends with the said yokes.

ARTHUR R. MISKIN.

In presence of—
 KNIGHT L. CLAPP,
 JAMES A. MELVILLE.

Copies of this patent may be obtained for five cents each, by addressing the "Commissioner of Patents, Washington, D. C."